United States Patent
Lee

(10) Patent No.: US 12,213,070 B2
(45) Date of Patent: Jan. 28, 2025

(54) METHOD FOR CONTROLLING CONNECTION TIME OF TERMINAL, AND AMF NODE FOR PERFORMING METHOD

(71) Applicant: SK TELECOM CO., LTD., Seoul (KR)

(72) Inventor: DongJin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 378 days.

(21) Appl. No.: 17/665,754

(22) Filed: Feb. 7, 2022

(65) Prior Publication Data
US 2022/0159575 A1 May 19, 2022

Related U.S. Application Data

(63) Continuation of application No. PCT/KR2020/013889, filed on Oct. 12, 2020.

(30) Foreign Application Priority Data

Oct. 14, 2019 (KR) ........................ 10-2019-0127238

(51) Int. Cl.
*G08C 17/00* (2006.01)
*H04W 52/02* (2009.01)
*H04W 76/38* (2018.01)

(52) U.S. Cl.
CPC ... *H04W 52/0229* (2013.01); *H04W 52/0216* (2013.01); *H04W 76/38* (2018.02)

(58) Field of Classification Search
CPC ......... H04W 52/0229; H04W 52/0216; H04W 76/38; H04W 76/12; H04W 76/28; H04W 60/00; H04W 80/10; Y02D 30/70

USPC ........................................................ 370/311
See application file for complete search history.

(56) References Cited

U.S. PATENT DOCUMENTS

| 10,462,840 | B2 * | 10/2019 | Dao ...................... H04W 76/30 |
| 10,715,681 | B2 * | 7/2020 | Yan ........................ H04W 12/61 |
| 10,728,952 | B2 * | 7/2020 | Dao ...................... H04L 41/342 |
| 10,798,753 | B2 * | 10/2020 | Castellanos Zamora .................... H04W 60/00 |
| 10,986,516 | B2 * | 4/2021 | Dao ...................... H04W 24/08 |

(Continued)

FOREIGN PATENT DOCUMENTS

| CN | 110268760 | 9/2019 |
| KR | 10-1634017 | 6/2016 |

(Continued)

OTHER PUBLICATIONS

Indian Office Action dated Sep. 9, 2022 issued in Application No. 202217025959.

(Continued)

*Primary Examiner* — Amancio Gonzalez
(74) *Attorney, Agent, or Firm* — KED & ASSOCIATES, LLP

(57) ABSTRACT

In accordance with an aspect of the present disclosure, there is provided a method for controlling connection time of a terminal by an Access and Mobility Management Function (AMF) node. The method comprises receiving information on first connection time from the terminal; and transmitting or receiving data to or from the terminal during the first connection time, wherein the information on the first connection time indicates time to activate a PDU session between the terminal and the AMF node.

15 Claims, 7 Drawing Sheets

(56) References Cited

U.S. PATENT DOCUMENTS

| | | | |
|---|---|---|---|
| 11,252,281 B2* | 2/2022 | Yan | H04W 12/61 |
| 11,350,482 B2* | 5/2022 | Kim | H04W 76/25 |
| 2015/0312855 A1 | 10/2015 | Razaghi et al. | |
| 2021/0099912 A1* | 4/2021 | Zhang | H04L 1/0002 |
| 2021/0410107 A1* | 12/2021 | Park | H04W 76/27 |

FOREIGN PATENT DOCUMENTS

| KR | 10-2017-0141679 | 12/2017 |
|---|---|---|
| KR | 10-1928497 | 2/2019 |
| WO | WO 2018/141255 | 8/2018 |
| WO | WO 2018/236164 | 12/2018 |

OTHER PUBLICATIONS

Chinese Office Action dated Sep. 20, 2023 issued in Application No. 202080071339.4.

3GPP; TSG SA; Procedures for the 5G System; Stage 2 (Release 15), 3GPP TS 23.502 V15.5.0, Mar. 25, 2019.

International Search Report dated Jan. 12, 2021 issued in Application No. PCT/KR2020/013889.

* cited by examiner

METHOD FOR CONTROLLING CONNECTION TIME OF TERMINAL, AND AMF NODE FOR PERFORMING METHOD

CROSS-REFERENCE TO RELATED APPLICATION

This application is a continuation of PCT Patent Application No. PCT/KR2020/013889, filed Oct. 12, 2020, which claims priority to Korean Patent Application No. 10-2019-0127238, filed Oct. 14, 2019, whose entire disclosures are hereby incorporated by reference.

TECHNICAL FIELD

The present disclosure relates to a method for controlling connection time of terminal, and an AMF node for performing the method.

BACKGROUND

In accordance with the success of Long Term Evolution (LTE)/LTE-Advanced (LTE-A) for 4G mobile communication, interest in the next generation, i.e., 5th generation (what we call 5G) mobile communication is being increased, and studies are actively progressing.

The 5G mobile communication defined by International Telecommunication Union (ITU) is providing a maximum data transfer speed of 20 Gbps and a perceived transfer speed of at least 100 Mbps in any place. The official name is 'IMT-2020', and it is targeted to be commercialized in 2020.

The ITU is suggesting three scenarios for use such as enhanced Mobile BroadBand (eMBB), massive Machine Type Communication (mMTC) and Ultra Reliable and Low Latency Communications (URLLC).

First, the URLLC relates to a scenario for use requiring high reliability and low delay time. For example, services such as autonomous driving, factory automation and augmented reality require the high reliability and the low delay time (e.g., delay time equal to or less than 1 ms). In present, the delay time of 4G (LTE) is statistically 21-43 ms (best 10%), 33-75 ms (median). This is not enough to support a service that requires the delay time equal to or less than 1 ms.

Then, the eMBB scenario for use relates to a scenario for use that requires a mobile Ultra-Wide Band (UWB).

It seems that this high-speed service of the Ultra-Wide Band would be difficult to be accepted by a core network designed for existing LTE/LTE-A.

Accordingly, a re-design of the core network is precisely required in the 5G mobile communication.

FIG. 1 shows a general structure of the 5G communication system.

Referring to FIG. 1, a UE is connected with a data network (DN) through a new generation Radio Access Network (RAN).

A Control Plane Function (CPF) node performs all or a part of Mobility Management Entity (MME) function of the 4G mobile communication, and all or a part of the Control Plane Function of Serving Gateway (S-GW) and PDN Gateway (P-GW). The CPF node includes Access and Mobility Management Function (AMF) and Session Management Function (SMF).

The MME is separated into Core Access and Mobility Management Function (AMF) and Session Management Function (SMF) in the 5G Core Network (CN). The AMF node performs the NAS interaction with the UE and the Mobility Management (MM), and the SMF node performs the Session Management (SM). Further, the SMF manages the User Plane Function (UPF) which performs a user-plane function, i.e., which is a gateway routing the user traffic. It is regarded that in the traditional EPC, the SMF takes charge of the control-plane part of the S-GW and the P-GW, and the UPF takes charge of the user-plane part. One or more UPF may be existed between the RAN and the Data Network (DN) for routing the user traffic.

The User Plane Function (UPF) node is a kind of gateway through which user data is transmitted or received. The UPF node may perform all or a part of the User Plane Function of the S-GW and the P-GW in the 4G mobile communication.

The Policy Control Function (PCF) is a node for controlling a policy of the common carrier.

The Application Function (AF) is a server for providing several services to UE.

The Unified Data Management (UDM) is a kind of server for managing the subscriber information such as the Home Subscriber Server (HSS) in the 4G mobile communication. The UDM may store the subscriber information in the Unified Data Repository (UDR) and manage the subscriber information.

The Authentication Server Function (AUSF) may authenticate and manage the UE.

The Network Slice Selection Function (NSSF) is a node for network slicing. In the 5G communication system, a concept of the network slicing is introduced for providing various services through one network. Here, the network slicing is a combination of network nodes having functions required for providing certain services. A network node constituting the slice instance may be an independent node in the hardware aspect, or a logically independent node.

Each slice instance may be composed of a combination of all the nodes required for constituting the entire network. In this case, one slice instance may solely provide services to the terminal. Differently, the slice instance may be composed of a combination of some nodes among the nodes constituting the network. In this case, the slice instance may not solely provide the services to the terminal, and may provide the services to the terminal in connection with existing other network nodes. Further, the services may be provided by a plurality of slice instances connecting with each other.

Meanwhile, in the present network system, the terminal may transmit or receive data any time if there is a request from the terminal. However, in this case, there may be a problem that the base station or the core network requires always be on standby all the time in order to receive signals of the terminal. Recently, since the DRX/eDRX is suggested, it is possible to sleep a wireless signal of the terminal. However, since the time period that the terminal would transmit the traffic may not be recognized even by the DRX/eDRX, it may be difficult to optimize the resource scheduling of the network.

SUMMARY

The problem to be solved by the present disclosure is to provide a method for controlling connection time of a terminal and an AMF node for performing the method.

However, the problem to be solved by the present disclosure is not limited to the above description, and another problem to be solved that is not mentioned may be clearly understood by those skilled in the art to which the present disclosure belongs from the following description.

In accordance with an aspect of the present disclosure, there is provided a method for controlling connection time of a terminal by an Access and Mobility Management Function (AMF) node. The method comprises receiving information on first connection time from the terminal; and transmitting or receiving data to or from the terminal during the first connection time, wherein the information on the first connection time indicates time to activate a PDU session between the terminal and the AMF node.

The method further comprises, when the first connection time is expired, disconnecting a connection of the terminal.

Wherein the information on the first connection time is received by being included in a service request for activating the PDU session.

The method further comprises, transmitting information on an expiration of the connection time to the terminal before the first connection time is expired; receiving information on second connection time in response to the information on the expiration of the connection time; and if the information on the second connection time is received, disconnecting a connection of the terminal after the second connection time is expired.

The method further comprises transmitting a request for generating the PDU session to a Session Management Function (SMF) node, wherein the request for generating the PDU session includes the information on the first connection time.

The method further comprises selecting one of a plurality of SMF nodes to request generation of the PDU session, based on whether the one can maintain a connection during the first connection time.

The method further comprises, if the information on the first connection time is received, changing at least one of information on paging or information on Discontinuous Reception (DRX) according to the information on the first connection time.

In accordance with another aspect of the present disclosure, there is provided a method for controlling connection time of a terminal by an Access and Mobility Management Function (AMF) node. The method comprising: receiving information on first connection time of the terminal from a Unified Data Management (UDM); and receiving data from the terminal during the first connection time, wherein the information on the first connection time indicates time to activate a PDU session between the terminal and the AMF node.

The method further comprises disconnecting a connection of the terminal if the first connection time is expired.

The method further comprises, receiving a registration request from the terminal, wherein the information on the first connection time is received by being included in authentication information which is a response to the registration request.

The method further comprises, receiving information on a change of the first connection time from a Policy Control Function (PCF) node; transmitting the information on the change of the first connection time to the terminal; and changing time for disconnecting a connection of the terminal based on the information on the change of the first connection time.

The method further comprises, transmitting information on an expiration of the connection time to the terminal before the first connection time is expired; receiving information on second connection time in response to the information on the expiration of the connection time; and if the information on the second connection time is received, disconnecting a connection of the terminal after the second connection time is expired.

In accordance with still another aspect of the present disclosure, there is provided an Access and Mobility Management Function (AMF) node for controlling connection time of a terminal. The AMF node comprises a transceiver configured to transmit and receive signal; and a processor configured to control the transceiver, wherein the processor is further configured to receive information on first connection time from the terminal by controlling the transceiver, and to transmit or receive data to or from the terminal during the first connection time by controlling the transceiver, wherein the information on the first connection time indicates time to activate a PDU session between the terminal and the AMF node.

In accordance with still another aspect of the present disclosure, there is provided an Access and Mobility Management Function (AMF) node for controlling connection time of a terminal. The AMF node comprises a transceiver configured to transmit and receive signal; and a processor configured to control the transceiver, wherein the processor is further configured to receive information on first connection time of the terminal from a Unified Data Management (UDM) by controlling the transceiver, and receive data from the terminal during the first connection time by controlling the transceiver.

In accordance with still another aspect of the present disclosure, there is provided a method for connecting to a network by a terminal. The method comprising, determining connection time based on a service to be performed; transmitting a service request or a registration request including the connection time to an Access and Mobility Management Function (AMF) node of a core network; in response to the service request or the registration request, receiving a service response indicating the service request is approved or a registration approval indicating the registration request is approved; and transmitting or receiving data during the connection time using the core network.

Wherein in the determining of the connection time based on the service to be performed, the connection time is determined based on at least one of a destination address of the service, a policy of the terminal, a position of the terminal, and a battery status of the terminal.

In accordance with still another aspect of the present disclosure, there is provided a terminal for determining connection time to connect to a network. The terminal comprises, a transceiver configured to transmit and receive signal; and a processor configured to control the transceiver, wherein the processor is further configured to determine connection time based on a service to be performed, transmit a service request or a registration request including the connection time to an Access and Mobility Management Function (AMF) node of a core network by controlling the transceiver, in response to the service request or the registration request, receiving a service response indicating the service request is approved or a registration approval indicating the registration request is approved by controlling the transceiver, and transmitting or receiving data during the connection time using the core network by controlling the transceiver.

According to an embodiment of the present disclosure, by controlling the time that the terminal is connected to the network, the terminal can use the battery efficiently and the core network can easily schedule the resource.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
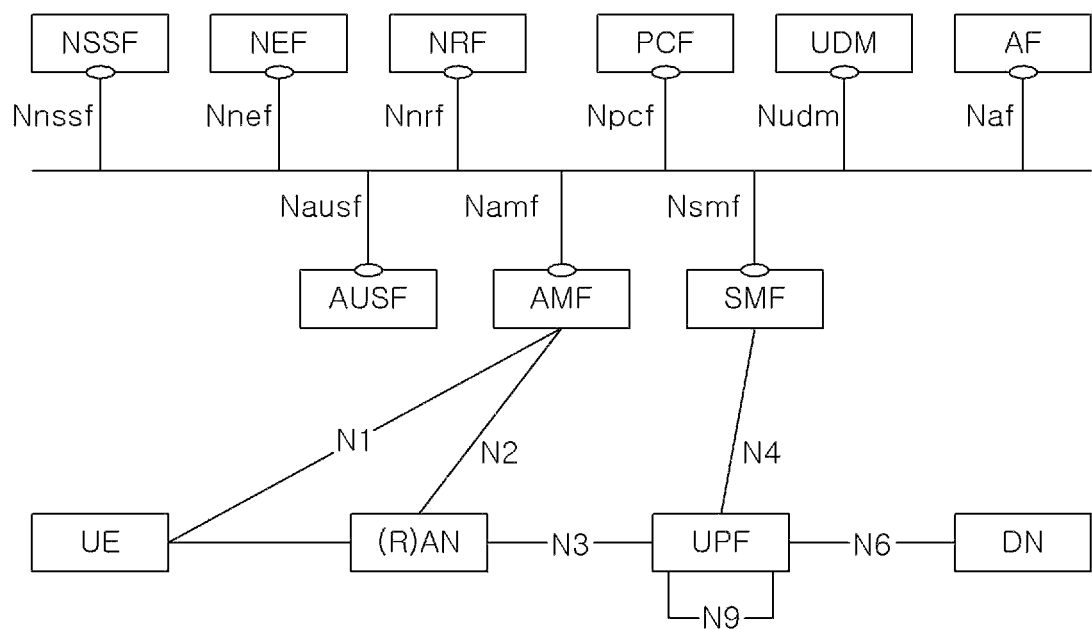
FIG. 1 illustrates a general structure of a 5G communication system.
Figure 2:
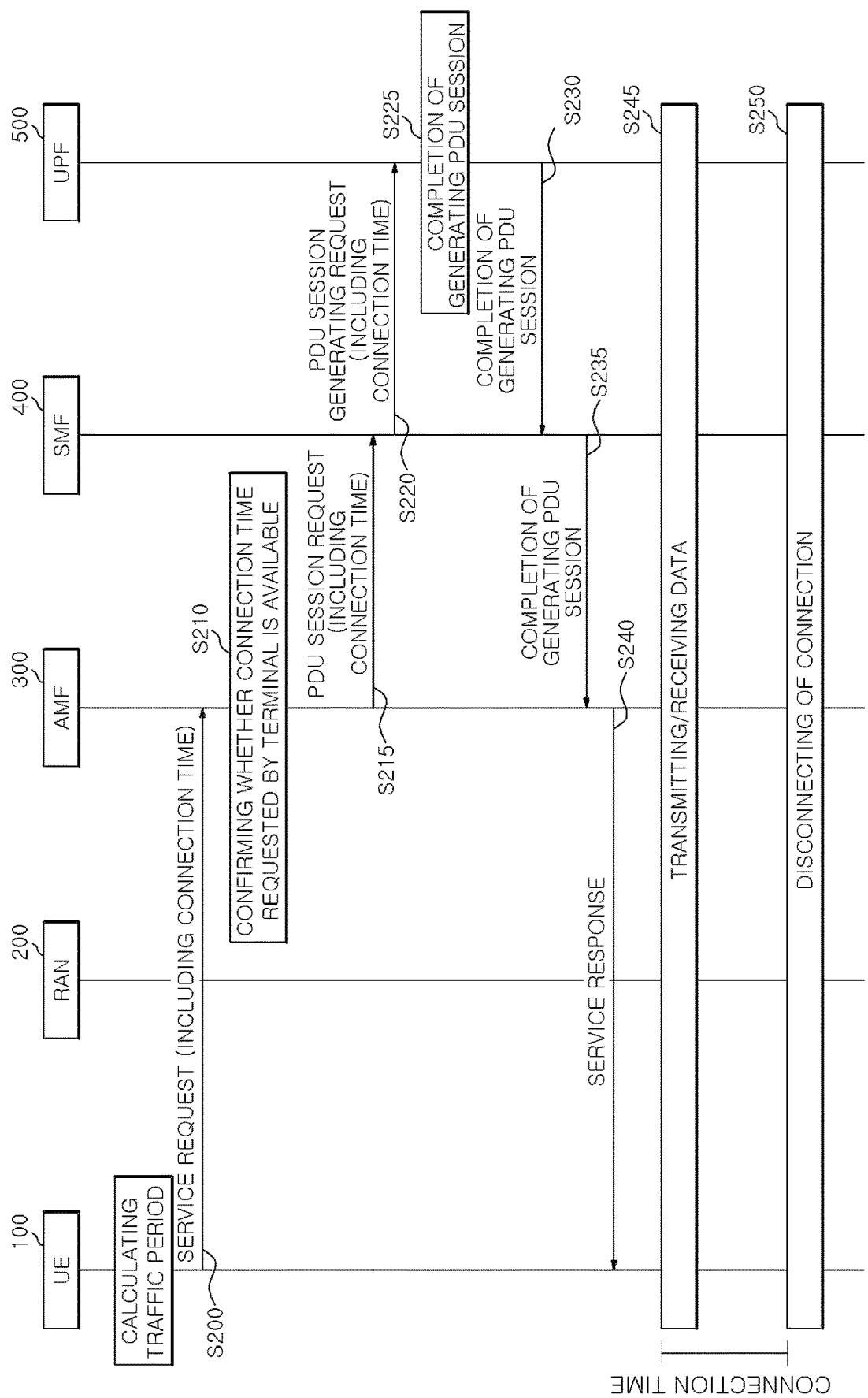
FIG. 2 is a flowchart illustrating a method for controlling connection time of a terminal in a service requesting process according to an embodiment of the present disclosure.

FIG. 2 is a flowchart illustrating a method for controlling connection time of a terminal in a service requesting process according to the embodiment of the present disclosure.

Referring to FIG. 2, a terminal 100 may calculate a traffic period, i.e., time for maintaining the connection, and transmit a service request including service information including connection time calculated through a base station 200 to an AMF node 300 (S200). The terminal 100 may be a terminal used in mMTC or cIOT. The connection time may mean the time during which the PDU session is activated between the terminal and the network.

The terminal 100 may determine the connection time according to a destination address (a destination server) of the corresponding service. Further, the terminal 100 may determine the connection time based on a past value, a policy, a position of the terminal, and a status of a battery.

Service information may include information about network slice information, PDU session information, N-tuple flow information, a service name, a service period (i.e., connection time), an amount of service usage, a service packet transmitting/receiving cycle, a size of a service packet, a service QoS, and a service gap.

The service information may be defined for each of the network slice, the PDU session or the N-tuple flow. According to the embodiment of the present disclosure, the service information may be defined based on types/characteristics of the service. For example, after grouping the services for defining service information for each of the size of the service packet, the time and/or the speed, and the service information may be defined for each of the grouped services.

The service period (connection time) may include the duration from the starting of transmitting the traffic to the finishing of transmitting the traffic, and the service period (connection time) may mean an absolute time or a relative time. That is, if the service period means the absolute time, the service period may mean a period based on the starting time of transmitting the traffic, and if the service period means the relative time, the service period may mean a period from a selected certain reference.

The service gap may mean a time gap after the service period (the connection time) is expired until the terminal re-transmits the traffic. That is, if the service gap is set, the terminal may not re-transmit the traffic during the service gap after the service period is expired.

The below Table 1 illustrates an example of the service information.

TABLE 1

| Slice information | PDU session information | N-tuple flow information | Service name | Service period | Service amount of usage | Service packet cycle | Service packet size | Service QoS | Service gap |
|---|---|---|---|---|---|---|---|---|---|
| Slice eMBB | . . . | . . . | 'ABC' | 35 s | 40 MB | . . . | {80, 100, 1250} byte | 1 Gb/s | 20 s |
| Slice mMTC | . . . | . . . | 'DEF' | 2 s | 1 MB | . . . | {60, 100, 250} byte | 100 Kb/s | 1 s |
| Slice URLLC | . . . | . . . | 'GHI' | 3600 s | 1,000 MB | . . . | {60, 65, 80} byte | 50 Mb/s | 15 s |

As described in Table 1, the service information in the first line is service information on the network slice for eMBB. The service name may be 'ABC', the required connection time may be 35 s, the service amount of usage may be 40 MB, the packet size may be 80, 100 and 1250 byte, the service quality (QoS) may satisfy 1 Gb/s, and the service gap may be 20 s.

In the same manner, the service information in the second line is service information on the network slice for mMTC. The service name may beDEF', the required connection time may be 2 s, the service amount of usage may be 1 MB, the packet size may be 60, 100 and 250 byte, the service quality (QoS) may satisfy 1 Kb/s, and the service gap may be 1 s.

Finally, the service information in the third line is the service information on the network slice for URLLC. The service name may be 'GHI', the required connection time may be 3600 s, the service amount of usage may be 1000 MB, the packet size may be 60, 65 and 80 byte, the service quality (QoS) may satisfy 50 Mb/s, and the service gap may be 15 s.

The AMF node 300 may determine whether the connection time requested by the terminal is acceptable or not (that is, whether the connection can be maintained during the connection time requested by the terminal), and if it is determined to be acceptable, the AMF node 300 may transmit the PDU session request to the SMF node 400 (S215).

More specifically, the AMF node 300 may search for the SMF node that can accept the service information transmitted from the terminal, and may transmit the PDU session request to the acceptable SMF node 400. At this time, if the acceptable SMF node is in plural number, the SMF node may be selected based on an item having the highest priority. The PDU session request may include the service information. Especially, the PDU session request may include information on the connection time.

Further, the AMF node 300 may determine whether the connection time requested by the terminal 100 is appropriate or not. As a result of determination, if it is determined that the terminal 100 requested connection time longer than the necessary time, the AMF node 300 may reset the time determined to be appropriate as the connection time, and transmit the reset connection time to the terminal 100 and the SMF node 400.

The AMF node 300 may adjust a wireless setting of the terminal 100 using received service information. According to the embodiment of the present disclosure, the AMF node 300 may change Paging information and DRX information of the terminal. Through this, it is possible to efficiently manage the battery of the terminal. As described below, since the SMF node 400 and the UPF node 500 may receive the service information including the connection time, the SMF node 400 and UPF node 500 as well as the AMF node 300 may adjust the wireless setting of the terminal.

The SMF node 400 may transmit the PDU session request including the service information to the UPF node 500 (S220), and the UPF node 500 may generate the PDU session in response to the PDU session request (S225).

The SMF node 400 and UPF node 500 that received the service information including the connection time may determine a connection or a disconnection of the terminal 100 by counting the connection time. According to the embodiment of the present disclosure, if it is determined that the connection time is expired, the SMF node 400 and UPF node 500 may not transmit the data any more, or may transmit a notification for an expiration of the connection time to the AMF node 300.

The UPF node 500 may transmit the completion of generating the PDU session to the SMF node 400 (S230), and the SMF node 400 may transmit the completion of generating the PDU session to the AMF node 300 (S235).

The AMF node 300 that received the completion of generating the PDU session may transmit a service response to the terminal 100 in response to the service request of the terminal 100 (S240).

If the service request is completed, the terminal 100 may be in a connected mode, and transmit/receive the data using the generated PDU session (S245).

If the connection time is expired, the AMF node 300 may disconnect the connection, and the terminal 100 may be in an idle status (S250).

According to the embodiment of the present disclosure, if the service gap is set, the terminal 100 may not re-transmit the service request until the set service gap is expired. That is, if the connection time is expired, the terminal 100 may re-transmit the service request to the AMF 300 after the set service gap is expired.

In FIG. 2, it is described that the service response is received from the AFM node 300 and the connection time is measured based on a timing at which the data is transmitted/received. However, the present disclosure is not limited to the description.

Figure 3:
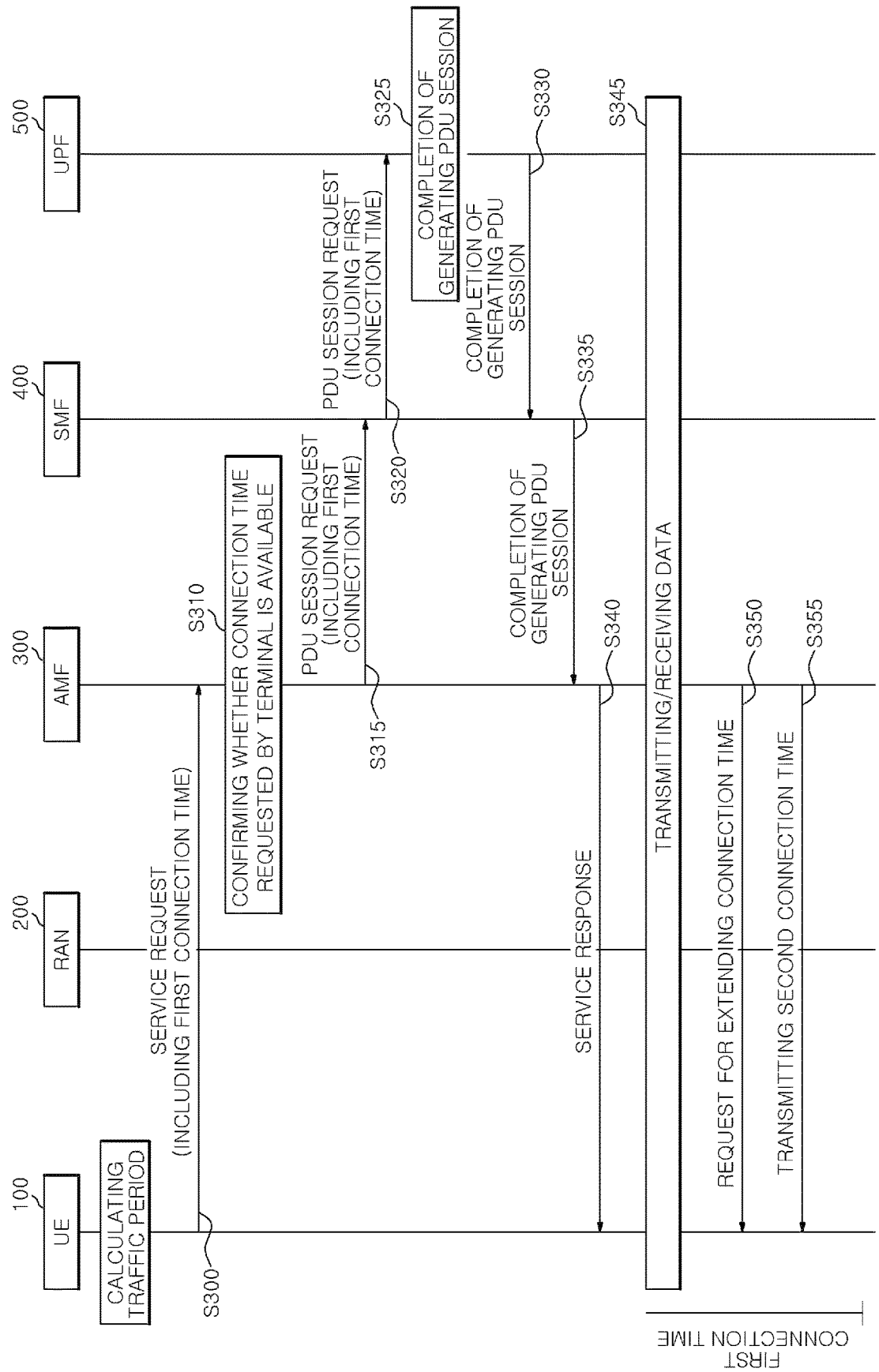
FIG. 3 is a flowchart illustrating a method for controlling connection time of the terminal in the service requesting process according to another embodiment of the present disclosure.

FIG. 3 is a flowchart illustrating a method for controlling connection time of the terminal in the service requesting process according to another embodiment of the present disclosure.

Among the description to be explained through FIG. 3, the parts duplicated with the description explained in FIG. 2 will be omitted. Thus, in FIG. 3, the operation of each device will be mainly explained.

Referring to FIG. 3, the terminal 100 may calculate the traffic period, i.e., the time for maintaining the connection, and transmit the service request including the service information including first connection time calculated through the base station 200 to the AMF node 300 (S300).

The AMF node 300 may determine whether the first connection time requested from the terminal is acceptable or not (that is, whether the connection can be maintained during the first connection time requested from the terminal) (S310). If it is determined to be acceptable, the AFM node 300 may transmit the PDU session request including the service information (information about the first connection time) to the SMF node 400 (S315).

The SMF node 400 may transmit the PDU session request including the service information (information about the first connection time) to the UPF node 500 (S320), and the UPF node 500 may generate the PDU session in response to the PDU session request (S325).

The UPF node 500 may transmit the completion of generating the PDU session to the SMF node 400 (S330), and the SMF node 400 may transmit the completion of generating the PDU session to the AMF node 300 (S335).

The AMF node 300 that received the completion of generating the PDU session may transmit the service response to the terminal 100 in response to the service request of the terminal 100 (S340).

If the service request is completed, the terminal 100 may be in a connected mode, and may transmit/receive the data during the first connection time using the generated PDU session (S345).

If it is determined that it is required to extend the connection time, the AMF node 300 may request to the terminal to extend the connection time before the first connection time is expired (S350). According to the embodiment of the present disclosure, the AMF node 300 may transmit the request including time to extend (e.g., the second connection time) to the terminal. In this case, the terminal received the request from the AMF node 300 may update the extension time transmitted from the AMF node 300 (e.g., the second connection time) to the service information, and transmit/receive additional data during the extension time (e.g., the second connection time).

According to another embodiment, the AMF node 300 may request to extend the connection time, and the terminal 100 may determine time to extend (e.g., the second connection time) and transmit the information regarding the determined extension time to the AMF node 300 (S355).

According to the embodiment of the present disclosure, the extension time (e.g., the second connection time) may mean additional time from the timing at which the first connection time ends, or newly counted time from the extended time.

Accordingly, if the extension time means additional time from the timing at which the first connection time ends, when the sum of the first connection time and the second connection time is expired, the AMF node 300 may disconnect the connection with the terminal 100, and the terminal 100 may be in an idle status.

Meanwhile, the terminal 100 may also determine that the extension of the connection time is required, and if it is determined that the extension of the connection time is required (e.g., a handover of the terminal, entering into a certain region of the terminal, an operation of the terminal in a low power mode, and so on), the terminal may request to extend the connection time to the AMF node 300. For example, the terminal 100 may set the connection time differently, or set the amount of the traffic usage differently, according to the importance of the service. Further, if there is not much charged amount of the battery, the terminal 100 may set the connection time to be short, make the service transmitting/receiving cycle (the packet inter-arrival time, the gap between the packets) longer, and set such that the data transmitting/receiving is performed during only the corresponding connection period.

If the connection time (the first connection time or the second connection time) is expired, the AFM node 300 may disconnect the connection and the terminal 100 may be in an idle status. If the service gap is set, the terminal 100 may not re-transmit the service request until the set service gap is expired. That is, the terminal 100 may re-transmit the service request to the AMF node 300 after the set service gap is expired.

Figure 4:
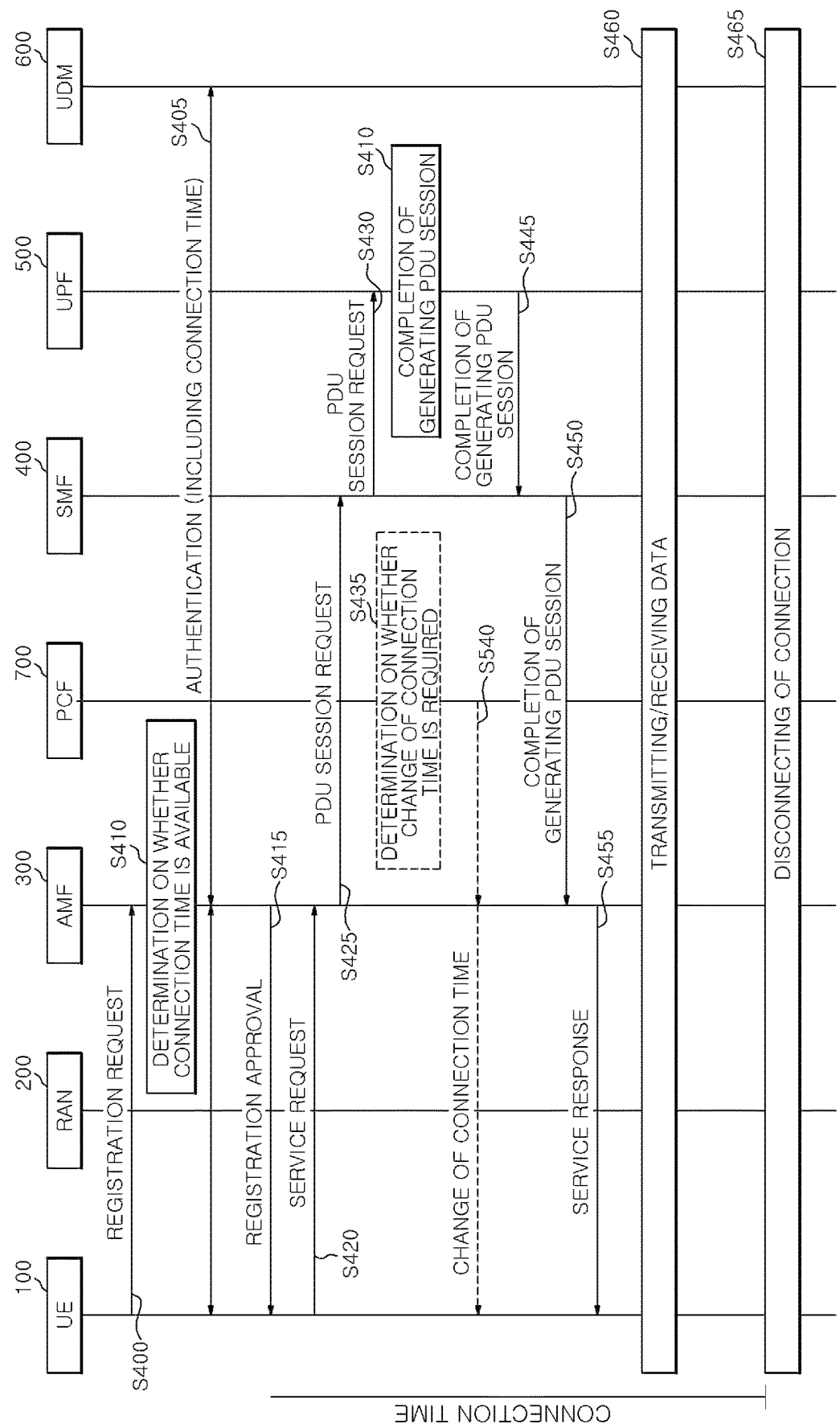
FIG. 4 is a flowchart illustrating a method for controlling connection time of the terminal in a terminal registration process according to another embodiment of the present disclosure.

FIG. 4 is a flowchart illustrating a method for controlling connection time of the terminal in a terminal registration process according to another embodiment of the present disclosure.

In FIG. 4, among the registration process of the terminal, the process directly related to the present disclosure is mainly explained. Accordingly, among the registration process of the terminal, the process which is not directly related to the present disclosure may be omitted. Further, among the description to be explained through FIG. 4, the parts duplicated with the description explained in FIG. 2 will be omitted. Accordingly, in FIG. 4, operations of each device will be mainly described.

Referring to FIG. 4, the terminal 100 may transmit the registration request to the AMF node 300 for the initial attach (S400).

According to the registration request of the terminal 100, the UDM node 600 may transmit information for authentication of the terminal 100 to the AMF node 300, and the AMF node 300 may transmit the information for authentication to the terminal 100 (S405). The information for authentication may include the service information including the connection time of the terminal.

The AMF node 300 that received the service information (connection time) from the UDM node 600 may determine whether the connection time received from the UDM node 600 is acceptable or not (S410).

More specifically, the AMF node 300 may determine whether there is a SMF node acceptable for the service information transmitted from the terminal, or determine whether the connection time received from the UDM node 600 is appropriate. As a result of the determination, if there is no acceptable SMF node, or if it is determined that the terminal 100 requested connection time longer than the necessary time, the AMF node 300 may reset the time to be determined appropriate as the connection time, and may transmit the reset connection time to the terminal 100 instead of the connection time received from the UDM node 600.

In response to the registration request of the terminal 100, the AMF node 300 may transmit the registration approval to the terminal (S415), thereby the registration process of the terminal 100 may be completed.

If the registration of the terminal 100 is completed, the terminal 100 may perform the service request. If the terminal 100 transmits the service request to the AMF node 300 (S420), the AMF node 300 may transmit the PDU session request to the SMF node 400 (S425). At this time, since the connection time between the terminal and the core network is already defined, the AMF node 300 may transmit the PDU session request to the SMF node 400 without including information on the connection time.

The SMF node 400 may transmit the PDU session request to the UPF node 500 (S430), and the UPF node 500 may generate the PDU session in response to the PDU session request.

According to the embodiment of the present disclosure, the PCF node 700 may determine whether it is required to change the connection time (S435). If it is determined that it is required to change the connection time, the PCF node 700 may transmit information on the change of the connection time to the AMF node 300, and the AMF node 300 may transmit the received information on the change of the connection time to the terminal 100 (S440).

According to the embodiment of the present disclosure, the information on the change of the connection time may include the connection time to be changed. In this case, the AMF node 300 and the terminal 100 may update the connection time to be changed received from the PCF node 700 to the service information.

Otherwise, according to another embodiment of the present disclosure, the information on the change of the connection time may include information related to the connection time of the terminal. In this case, the AMF node 300 or the terminal 100 may determine the connection time to be changed based on the received information related to the connection time of the terminal, and may update the determined connection time to the service information.

Meanwhile, the operation order of the S435 step and the S440 step may not be limited to the description of the present disclosure. That is, the determination on the change of the connection time of the PCF node 700 (S435) and the notification on the change of the connection time (S440) may be performed at any time after the registration request is started and before the connection time is finished.

The UPF node 500 may transmit the completion of generating the PDU session to the SMF node 400 (S445), and the SMF node 400 may transmit the completion of generating the PDU session to the AMF node 300 (S450).

The AMF node 300 received the completion of generating the PDU session may transmit the service response to the terminal 100 in response to the service request of the terminal 100 (S455).

If the service request is completed, the terminal 100 may be in a connected mode, and may transmit/receive data during the first connection time using the generated PDU session (S460).

If the connection time is completed, the AMF node 300 may disconnect the connection, and the terminal 100 may be in an idle status (S465).

According to the embodiment of the disclosure, in case that the service gap is set, the terminal 100 may not re-transmit the registration request until the set service gap is expired. That is, if the connection time is expired, the terminal 100 may re-transmit the registration request to the AMF node 300 after the set service gap is expired.

Figure 5:
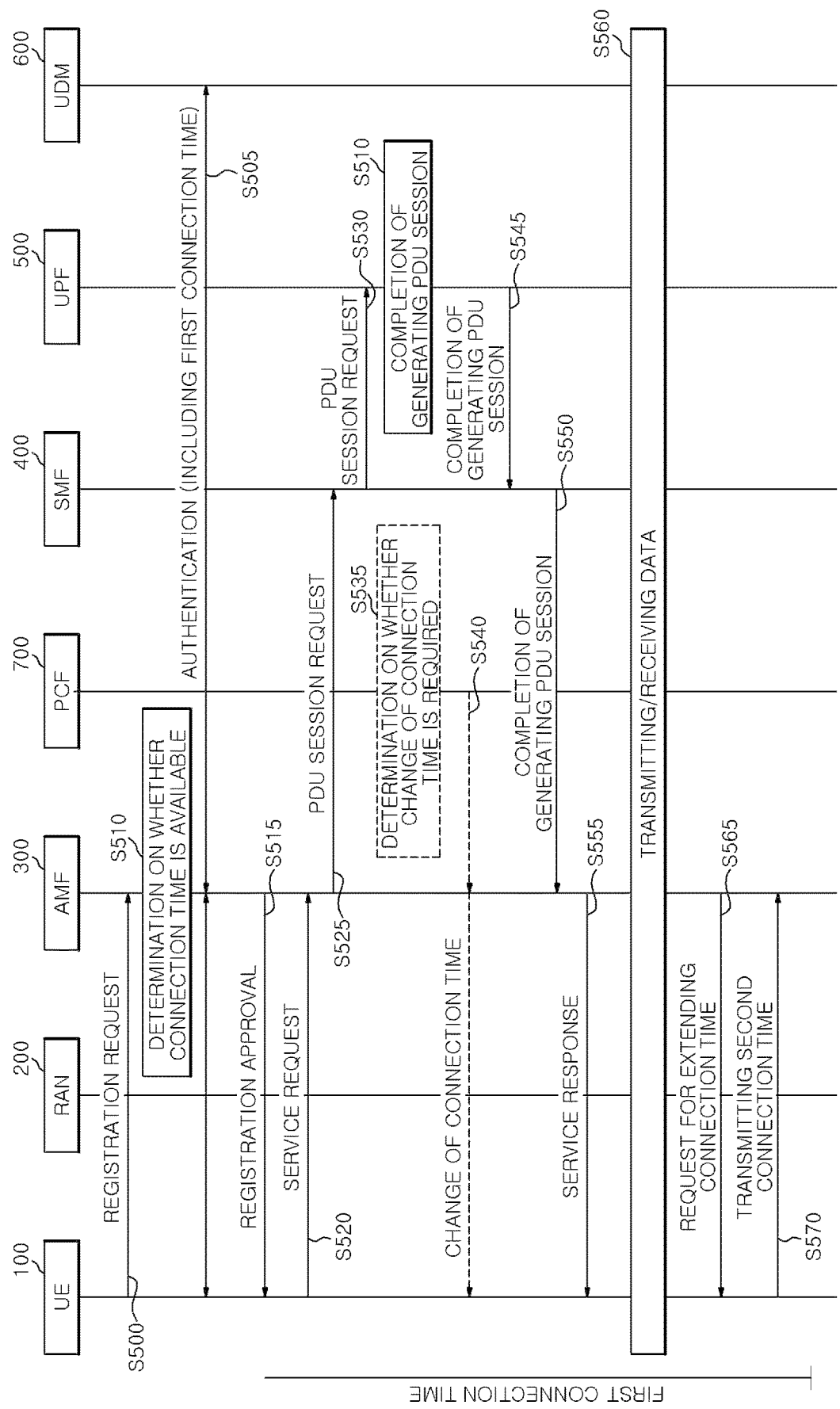
FIG. 5 is a flowchart illustrating a method for controlling connection time of the terminal in the terminal registration process according to another embodiment of the present disclosure.

FIG. 5 is a flowchart illustrating a method for controlling connection time of the terminal in the terminal registration process according to another embodiment of the present disclosure.

In FIG. 5, among the registration process of the terminal, the process directly related to the present disclosure is mainly explained. Accordingly, among the registration process of the terminal, the process which is not directly related to the present disclosure may be omitted. Further, among the description to be explained through FIG. 5, the parts duplicated with the description explained in FIG. 2 and FIG. 4 will be omitted.

Referring to FIG. 5, the terminal 100 may transmit the registration request to the AMF node 300 for initial attach (S500).

According to the registration request of the terminal 100, the UDM node 600 may transmit information for authentication of the terminal 100 to the AMF node 300, and the AMF node 300 may transmit the information for authentication to the terminal 100 (S505). The information for authentication of the terminal may include the service information including the first connection time.

The AMF node 300 that received the service information (the first connection time) from the UDM node 600 may determine whether the first connection time is acceptable or not (S510).

More specifically, the AMF node 300 may determine whether there is a SMF node that is acceptable for the service information transmitted from the terminal, or whether the first connection time received from the UDM node 600 is appropriate. As a result of determination, if it is determined that there is no acceptable SMF node, or if the terminal 100 requested connection time longer than the necessary time, the AMF node 300 may reset the connection time determined to be appropriate as the connection time, and transmit the reset connection time to the terminal 100 instead of the connection time received from the UDM node 600.

In response to the registration request of the terminal 100, the AMF node 300 may transmit the registration approval to the terminal 100, thereby the registration process of the terminal 100 may be completed.

If the registration of the terminal 100 is completed, the terminal 100 may perform the service request. If the terminal 100 transmits the service request to the AMF node 300 (S520), the AMF node 300 may transmit the PDU session request to the SMF node 400 (S525). At this time, the first connection time is already defined between the terminal and the core network, the AMF node 300 may transmit the PDU session request to the SMF node 400 without including information on the first connection time.

The SMF node 400 may transmit the PDU session request to the UPF node 500 (S530), and the UPF node 500 may generate the PDU session in response to the PDU session request.

According to the embodiment of the present disclosure, the PCF node 700 may determine whether it is required to change the connection time (S535). If it is determined that it is required to change the connection time, the PCF node 700 may transmit information on the change of the connection time to the AMF node 300, and the AMF node 300 may transmit the received information on the change of the connection time to the terminal 100 (S540).

Meanwhile, the operation order of the S535 step and the S540 step may not be limited to the description of the present disclosure. That is, the determination on the change of the connection time of the PCF node 700 (S535) and the notification on the change of the connection time (S540) may be performed at any time after the registration request is started and before the connection time is finished.

The UPF node 500 may transmit the completion of generating the PDU session to the SMF node 400 (S545), and the SMF node 400 may transmit the completion of generating the PDU session to the AMF node 300 (S550).

The AMF node 300 that received the completion of generating the PDU session may transmit the service response to the terminal 100 in response to the service request of the terminal 100 (S555).

In case that the service request is completed, the terminal 100 may be in a connected mode, and may transmit/receive the data during the first connection time using the generated PDU session (S560).

If it is determined that it is required to extend the connection time, the AMF node 300 may request to extend the connection time to the terminal before the first connection time is expired (S565). According to the embodiment of the present disclosure, the AMF node 300 may transmit requests including time to extend (e.g., the second connection time) to the terminal. In this case, the terminal received the requests from the AMF node 300 may update the extension time (e.g., the second connection time) transmitted from the AMF node 300 to the service information, and may transmit/receive additional data during the extension time (e.g., the second connection time).

According to another embodiment of the present disclosure, the AMF node 300 may request to extend the connection time, and the terminal 100 may determine the time to extend (e.g., the second connection time) and transmit information on the determined extension time to the AMF node 300 (S570).

According to the embodiment of the present disclosure, the extension time (e.g., the second connection time) may mean additional time from the timing at which the first connection time ends, or newly counted time from the extended time.

Accordingly, if the extension time means additional time from the timing at which the first connection time ends, when the sum of the first connection time and the second connection time is expired, the AMF node 300 may disconnect the connection with the terminal 100, and the terminal 100 may be in an idle status.

If the connection time (the first connection time or the second connection time) is expired, the AMF node 300 may disconnect the connection, and the terminal may be in an idle status. At this time, if the service gap is set, the terminal 100 may not re-transmit the registration request until the set service gap is expired. That is, the terminal 100 may re-transmit the registration request to the AMF node 300 after the set service gap is expired.

Figure 6:
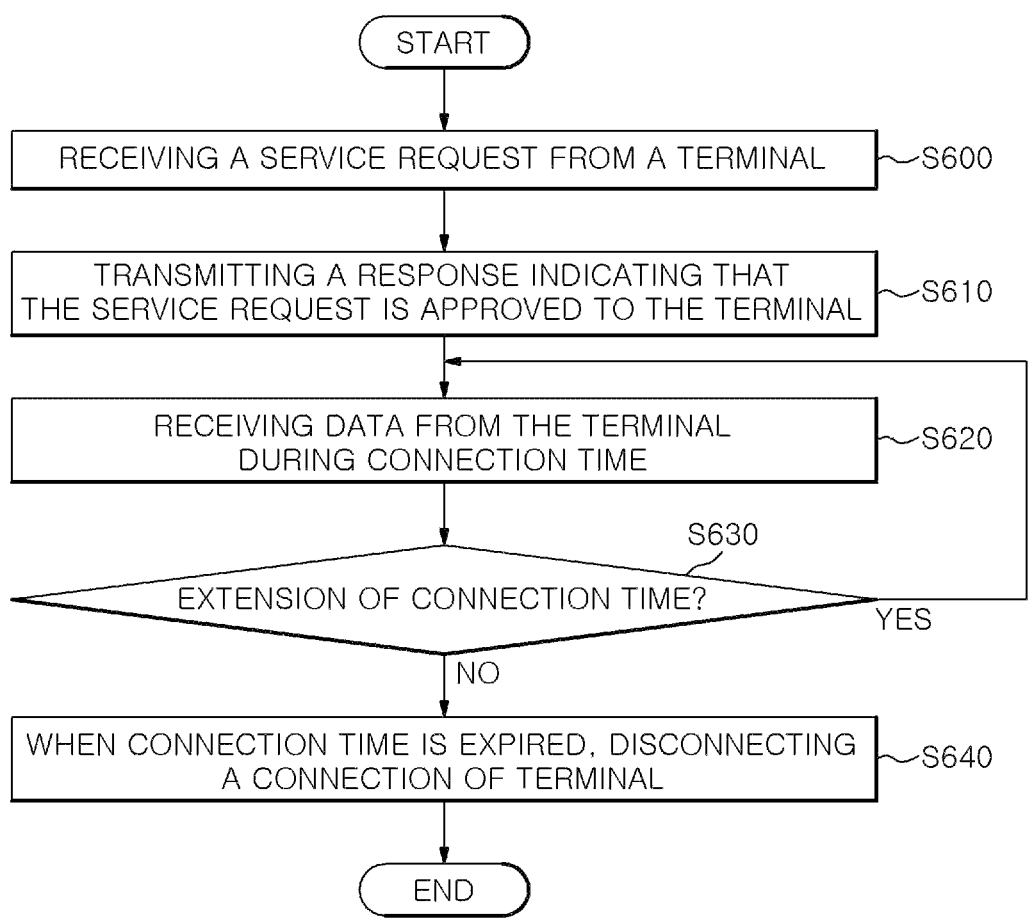
FIG. 6 is a flowchart illustrating an operation of an AMF node for controlling the connection time of the terminal according to the embodiment of the present disclosure.

FIG. 6 is a flowchart illustrating an operation of an AMF node for controlling the connection time of the terminal according to the embodiment of the present disclosure.

Referring to FIG. 6, the AMF node 300 may receive the service request including the connection time from the terminal 100 (S600). According to the embodiment of the present disclosure, the AMF node 300 may determine whether the connection time is appropriate.

In response to the service request, the AMF node 300 may transmit the service response indicating that the service request is approved to the terminal 100 (S610).

If the service request is approved, the terminal 100 may be in a connected mode, and the AMF node 300 may transmit/receive the data from the terminal 100 through the base station 200 during the set connection time (S620).

Before the connection time is expired, the AMF node 300 may determine whether the connection time is required to be extended (changed) (S630).

As a result of determination, if it is determined that the extension is required (Yes in S630), the AMF node 300 may transmit the extension request of the connection time to the terminal, and may transmit/receive the data from the terminal 100 until the extension time is expired. According to the embodiment of the present disclosure, the extension request of the connection time may include the connection time to be extended.

Meanwhile, if it is determined that the extension is not required (No in S630), the AMF node 300 may not extend the connection time, and disconnect the connection of the terminal 100 if the set connection time is expired (S640).

According to the embodiment of the present disclosure, in case that the service gap is set, the terminal 100 may not re-transmit the service request until the set service gap is expired. That is, if the connection time is expired, the terminal 100 may re-transmit the service request to the AMF node 300 after the set service gap is expired.

Figure 7:
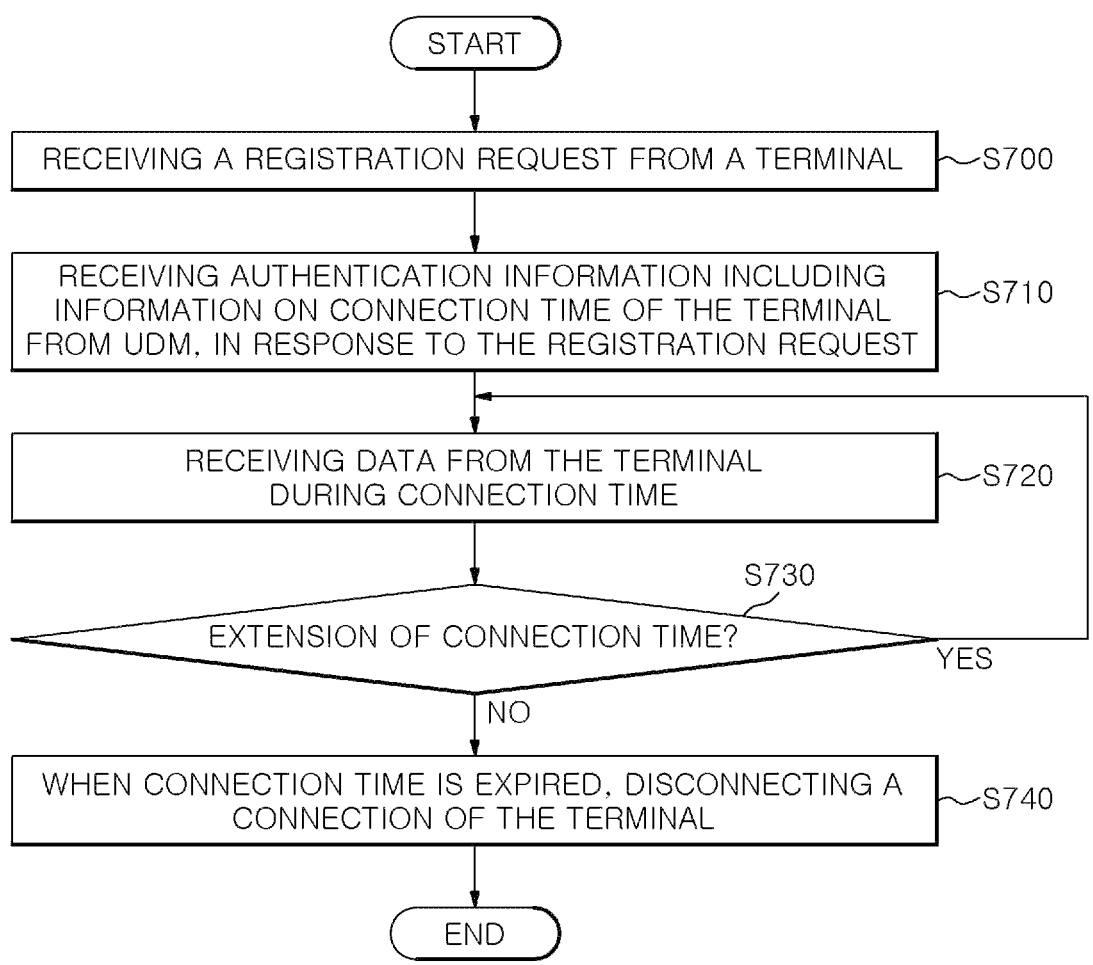
FIG. 7 is a flowchart illustrating the operation of the AMF node for controlling the connection time of the terminal according to another embodiment of the present disclosure.

FIG. 7 is a flowchart illustrating the operation of the AMF node for controlling the connection time of the terminal according to another embodiment of the present disclosure.

Referring to FIG. 7, the AMF node 300 may receive the registration request from the terminal 100 (S700).

The AMF node 300 may receive the authentication information including information on the connection time of the terminal from the UDM node 600 in response to the registration request of the terminal 100 (S710), and may transmit the received authentication information to the terminal 100. According to the embodiment of the present disclosure, the AMF node 300 may determine whether there is a SMF node acceptable for the service information transmitted from the terminal, or determine whether the first connection time received from the UDM node 600 is appropriate.

If the registration request and the service request are approved, the AMF node 300 may transmit/receive the data from the terminal 100 through the base station 200 during the connection time included in the authentication information (S720).

Before the connection time is expired, the AMF node 300 may determine whether the connection time is required to be extended (changed) (S730).

If it is determined that the extension is required (Yes in S730), the AMF node 300 may transmit the extension request of the connection time to the terminal, and transmit/receive the data from the terminal 100 until the extension time is expired. According to the embodiment of the present disclosure, the extension request of the connection time may include the connection time to be extended.

Meanwhile, if it is determined that the extension is not required (No in S730), the AMF node 300 may not extend the connection time, and may disconnect the connection of the terminal 100 if the set connection time is expired without extending the connection time (S740).

According to the embodiment of the present disclosure, if the service gap is set, the terminal 100 may not re-transmit the registration request until the set service gap is expired. That is, if the extension time is expired, the terminal 100 may re-transmit the registration request to the AMF node 300 after the set service gap is expired.

Combinations of each block of the block diagram and each step of the flowchart in the present disclosure may be performed by computer program instructions. Since these computer program instructions may be mounted on an encoding processor of a general-purpose computer, a special purpose computer, or other programmable data processing equipment, a means by which the instructions executed by the encoding processor of the computer or other programmable data processing equipment performs the functions described in each block of the block diagram or each step in the flowchart may be generated. Since these computer program instructions may be stored in computer-usable or computer-readable memory that may be directed to the computer or other programmable data processing equipment to implement a function in a particular way, the instructions stored in the computer-usable or computer-readable memory may produce manufactures including an instruction means for performing the functions described in each block of the block diagram or each step of the flowchart. Since the computer program instructions may be mounted on the computer or other programmable data processing equipment, instructions that operate the computer or other programmable data processing equipment by generating a process in which a series of operational steps are performed on the computer or other programmable data processing equipment and executed by the computer may provide steps of performing the functions described in each block of the block diagram and each step of the flowchart.

In addition, each block or each step may represent a part of a module, segment, or code that includes one or more executable instructions for executing specified logical function(s). Further, it may be noted that in some alternative embodiments, functions described in blocks or steps may occur regardless of the described order. For example, two blocks or two steps shown in succession may be performed substantially simultaneously, or sometimes be performed in the reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for controlling connection time of a terminal by an Access and Mobility Management Function (AMF) node, the method comprising:
   receiving information on first connection time from the terminal; and
   transmitting or receiving data to or from the terminal during the first connection time,
   wherein the information on the first connection time indicates time to activate a PDU session between the terminal and the AMF node,
   wherein the first connection time is set by the terminal, and determined based on a service to be performed, and a destination address of the service.

2. The method of claim 1, further comprising:
   when the first connection time is expired, disconnecting a connection of the terminal.

3. The method of claim 1, wherein the information on the first connection time is received by being included in a service request for activating the PDU session.

4. The method of claim 1, further comprising:
transmitting information on an expiration of the connection time to the terminal before the first connection time is expired;
receiving information on second connection time in response to the information on the expiration of the connection time; and
if the information on the second connection time is received, disconnecting a connection of the terminal after the second connection time is expired.

5. The method of claim 1, further comprising:
transmitting a request for generating the PDU session to a Session Management Function (SMF) node,
wherein the request for generating the PDU session includes the information on the first connection time.

6. The method of claim 1, further comprising:
selecting one of a plurality of SMF nodes to request generation of the PDU session, based on whether the one can maintain a connection during the first connection time.

7. The method of claim 1, further comprising:
if the information on the first connection time is received, changing at least one of information on paging or information on Discontinuous Reception (DRX) according to the information on the first connection time.

8. A method for controlling connection time of a terminal by an Access and Mobility Management Function (AMF) node, the method comprising:
receiving information on first connection time of the terminal from a Unified Data Management (UDM); and
receiving data from the terminal during the first connection time,
wherein the information on the first connection time indicates time to activate a PDU session between the terminal and the AMF node,
wherein the first connection time is set by the terminal, and determined based on a service to be performed, and a destination address of the service.

9. The method of claim 8, further comprising:
disconnecting a connection of the terminal if the first connection time is expired.

10. The method of claim 8, further comprising:
receiving a registration request from the terminal,
wherein the information on the first connection time is received by being included in authentication information which is a response to the registration request.

11. The method of claim 8, further comprising:
receiving information on a change of the first connection time from a Policy Control Function (PCF) node;
transmitting the information on the change of the first connection time to the terminal; and
changing time for disconnecting a connection of the terminal based on the information on the change of the first connection time.

12. The method of claim 8, further comprising:
transmitting information on an expiration of the connection time to the terminal before the first connection time is expired;
receiving information on second connection time in response to the information on the expiration of the connection time; and
if the information on the second connection time is received, disconnecting a connection of the terminal after the second connection time is expired.

13. A method for connecting to a network by a terminal, the method comprising:
determining connection time based on a service to be performed;
transmitting a service request or a registration request including the connection time to an Access and Mobility Management Function (AMF) node of a core network;
in response to the service request or the registration request, receiving a service response indicating the service request is approved or a registration approval indicating the registration request is approved; and
transmitting or receiving data during the connection time using the core network,
wherein the determining the connection time includes:
determining a destination address of the service, and
setting the connection time based on the determined destination address.

14. The method of claim 13, wherein in the determining of the connection time based on the service to be performed, the connection time is determined based on a policy of the terminal, a position of the terminal, and a battery status of the terminal.

15. The method of claim 1, wherein the first connection time is determined based on a policy of the terminal, a position of the terminal, and a battery status of the terminal.

* * * * *